Sept. 28, 1954  E. J. AYCOCK  2,690,044
DEVICE FOR GATHERING NUTS
Filed Nov. 1, 1951
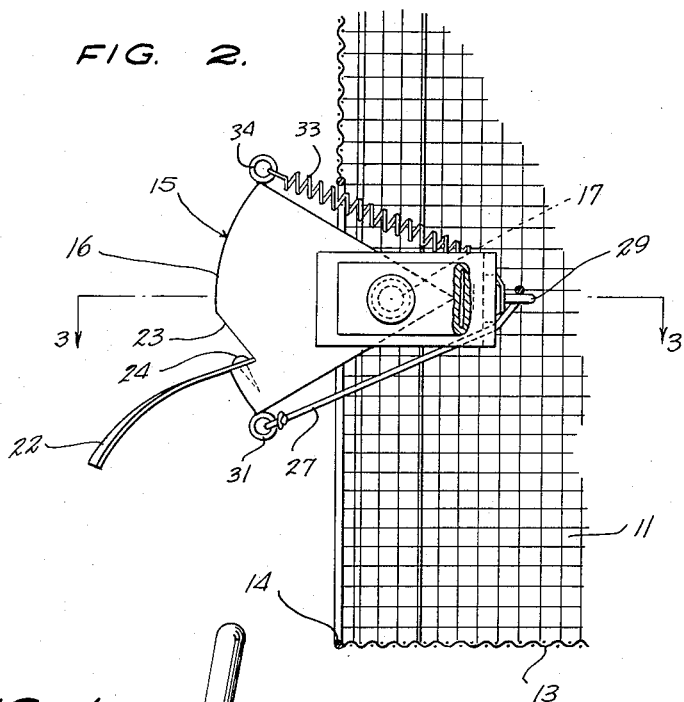
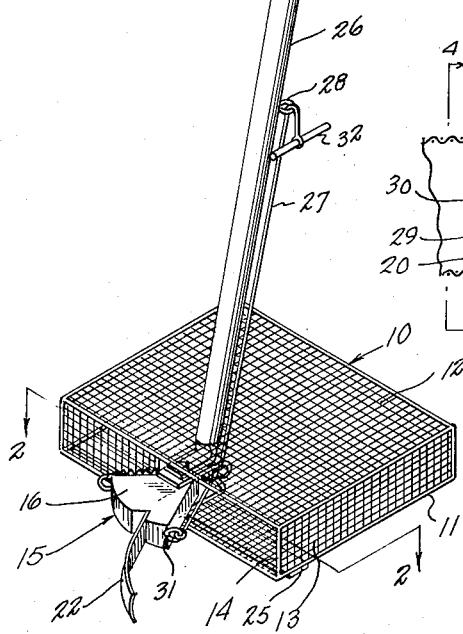
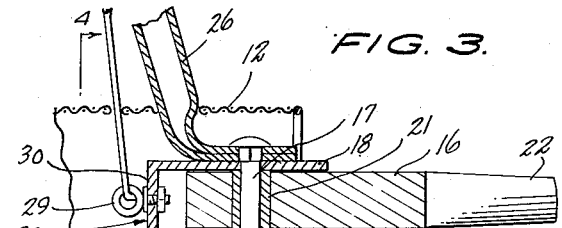
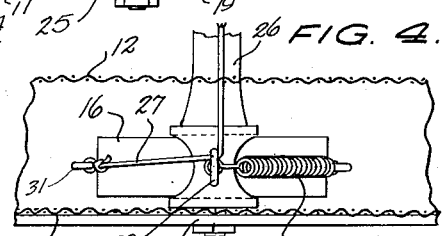
INVENTOR.
ELSIE J. AYCOCK,
BY
McMorrow, Berman & Davidson
ATTORNEYS.

Patented Sept. 28, 1954

2,690,044

UNITED STATES PATENT OFFICE 2,690,044

DEVICE FOR GATHERING NUTS

Elsie J. Aycock, Brooklet, Ga.

Application November 1, 1951, Serial No. 254,365

4 Claims. (Cl. 56—328)

This invention relates to a nut gathering device.

An object of the present invention is to provide a device which enables the gathering of fallen nuts without stooping by the operator.

Another object of the present invention is to provide a device which is simple in structure, and positive in action.

Other and further objects and advantages of the invention will become apparent from a consideration of the following description taken in conjunction with the accompanying drawing, wherein:

Figure 1 is a perspective view of the nut gathering device of the present invention.

Figure 2 is an enlarged fragmentary sectional view taken on the line 2—2 of Figure 1.

Figure 3 is a sectional view taken on the line 3—3 of Figure 2.

Figure 4 is an elevational view taken on the line 4—4 of Figure 3.

Referring to the drawings, the numeral 10, Figure 1, designates a receptacle, preferably formed of reticulated material and including a bottom 11, a top 12, and an upstanding side wall 13 extending about and connected to the bottom and top. Exteriorly of and carried by the bottom 11 of the receptacle 10 is a wear plate 25 which is adapted to engage a ground surface. The side wall 13 of the receptacle 10 is provided with an opening 14, and arranged exteriorly of the receptacle 10 adjacent the opening 14 is a finger 15, the finger having one end connected to the receptacle for rocking movement about a vertical axis toward and away from the receptacle opening 14. Specifically, the finger 15 embodies a support member 16 of triangular shape and which is arranged exteriorly of the receptacle 10 and has one end or the apex end positioned within the receptacle adjacent the opening 14 and connected to the receptacle for rocking movement about a vertical axis or bolt 17 toward and away from the receptacle opening 14. As shown in Figure 3, the one or apex end of the support member 16 is received between the legs 18 and 19 of the U-shaped bar 20 which is fixed to the bottom 11 of the receptacle 10 adjacent the opening 14 thereof. Extending through and fixedly supported in the legs 18 and 19 of the bar 20 is the bolt 17, the portion of the bolt between the legs 18 and 19 having a bearing 21 carried by the one or apex end of the support member 16 supported thereon for rocking movement therearound as an axis. Projecting horizontally from the other end of the support member 16 intermediate its diverging sides is a tongue 22, the tongue having one end fixedly secured to a wall of a notch 23 formed in the other end of the support member 16 intermediate its diverging sides by means of a screw 24.

Exteriorly of the receptacle 10 is an upstanding handle 26 which has its lower end extending through the receptacle top 12 and secured to bar 20 by the bolt 17. The handle 26 carries a pull cord 27 which has one end secured to the finger 15 for effecting the rocking movement of the finger toward the receptacle opening 14. The cord 27 is supported in an eye 28 carried by the handle 26 adjacent its upper end and extends through an eye 29 projecting from the bight 30 of the U-shaped bar 20 and has the lower end attached to an eye 31 projecting from one of the diverging sides of the support member 16 adjacent the other end thereof with the upper end of the cord 27 being affixed to a rod 32. Resilient means is operatively connected to the receptacle 10 and to the finger 15 for causing the rocking movement of the finger away from the receptacle opening 14, such means embodying a coil spring 33 which has one end attached to the eye 29 and has the other end secured to an eye 34 projecting from the other of the diverging sides of the support member 16 adjacent the other end thereof.

In operation of the nut gathering device of the present invention the receptacle 10 is placed so that the wear plate 25 engages the ground surface and is slid along such surface until nuts lying on such surface are positioned between the tongue 22 and the receptacle opening 14, whereupon an upward pull is exerted upon the rod 32 resulting in the rocking movement of the support member 16 toward the receptacle opening 14 about the bolt 17 as an axis and pushing of the nuts by the tongue 22 through the opening 14 and into the receptacle 10. At this point, the upward pull on the rod is released, causing the support member 16 and the finger 22 carried thereby to rock about the axis of bolt 17 away from the receptacle opening 14 and under the action of the coil spring 33. This operation is repeated successively until the receptacle 10 is filled with nuts.

Having fully described the invention, what I claim as new and desire to secure by Letters Patent is:

1. A nut gathering device comprising a receptacle including a bottom, a top, and an upstanding side wall extending about and connected to said bottom and top, there being an opening in said side wall, a finger arranged exteriorly of said receptacle adjacent said opening thereof and having one end connected to said receptacle for rocking movement about a vertical axis toward and away from said receptacle opening, an upstanding handle exteriorly of said receptacle and having the lower end fixed to said receptacle, a pull cord carried by said handle and having one end secured to said finger for effecting the rocking movement of said finger toward said receptacle opening, and resilient means operatively connected to said receptacle and to said finger for causing the rocking movement of said finger away from said receptacle opening.

2. A nut gathering device comprising a reticulated receptacle including a bottom, a top, and an upstanding side wall extending about and connected to said bottom and top, a wear plate exteriorly of and carried by the receptacle bottom adapted to engage a ground surface, there being an opening in said side wall, a finger arranged exteriorly of said receptacle adjacent said opening thereof and having one end connected to said receptacle for rocking movement about a vertical axis toward and away from said receptacle opening, an upstanding handle exteriorly of said receptacle and having the lower end fixed to said receptacle, a pull cord carried by said handle and having one end secured to said finger for effecting the rocking movement of said finger toward said receptacle opening, and resilient means operatively connected to said receptacle and to said finger for causing the rocking movement of said finger away from said receptacle opening.

3. A nut gathering device comprising a receptacle including a bottom, a top, and an upstanding side wall extending about and connected to said bottom and top, there being an opening in said side wall, a support member arranged exteriorly of said receptacle and having one end positioned within said receptacle adjacent the opening of the latter and connected to said receptacle for rocking movement about a vertical axis toward and away from said receptacle opening, a tongue projecting horizontally from the other end of said support member, an upstanding handle exteriorly of said receptacle and having the lower end fixed to said receptacle, a pull cord carried by said handle and having one end secured to said support member for effecting the rocking movement of said support member toward said receptacle opening, and resilient means operatively connected to said receptacle and to said support member for causing the rocking movement of said support member away from said receptacle opening.

4. A nut gathering device comprising a receptacle including a bottom, a top, and an upstanding side wall extending about and connected to said bottom and top, there being an opening in said side wall, a triangular shaped support member arranged exteriorly of said receptacle and having the apex end positioned within said receptacle adjacent the opening of the latter and connected to said receptacle for rocking movement about a vertical axis toward and away from said receptacle opening, a tongue projecting horizontally from the other end of said support member intermediate the diverging sides thereof, an upstanding handle exteriorly of said receptacle and having the lower end fixed to said receptacle, a pull cord carried by said handle and having one end secured to one of the diverging sides of said support member adjacent the other end thereof for effecting the rocking movement of said support member toward said receptacle opening, and a coil spring operatively connected to said receptacle and to the other of the diverging sides of said support member adjacent the other end thereof for causing the rocking movement of said support member away from said receptacle opening.

References Cited in the file of this patent

UNITED STATES PATENTS

| Number | Name | Date |
|---|---|---|
| 908,208 | Crawford, Sr. | Dec. 29, 1908 |
| 1,070,204 | Sweeney | Aug. 12, 1913 |
| 1,095,585 | Mack | May 5, 1914 |
| 1,212,225 | Hunt | Jan. 16, 1917 |
| 2,427,486 | Wyland | Sept. 16, 1947 |